United States Patent
Malone et al.

[19]

[11] Patent Number: 6,040,953
[45] Date of Patent: Mar. 21, 2000

[54] ADAPTIVE DATA RECOVERY METHOD AND MEANS TUNED TO THERMAL ASPERITIES IN A CYCLIC, MULTITRACKED MAGNETIC STORAGE SUBSYSTEM

[75] Inventors: Dan J. Malone; Paul Hardy, both of San Jose, Calif.

[73] Assignee: International Business Machines Corporation, Armonk, N.Y.

[21] Appl. No.: 08/823,732

[22] Filed: Mar. 25, 1997

[51] Int. Cl.[7] ............................... G11B 5/09; G11B 5/02; G11B 21/02

[52] U.S. Cl. ........................... 360/53; 360/25; 360/75; 714/765

[58] Field of Search .................. 360/53, 46, 75, 360/65, 25, 31; 371/39.1, 40.3, 37.7; 714/765

[56] References Cited

U.S. PATENT DOCUMENTS

| | | | |
|---|---|---|---|
| 4,516,165 | 5/1985 | Cunningham et al. | 360/53 |
| 5,379,162 | 1/1995 | Cunningham et al. | 360/53 |
| 5,551,003 | 8/1996 | Mattson et al. | 395/463 |
| 5,751,733 | 5/1998 | Glover | 371/40.3 |
| 5,754,355 | 5/1998 | Nakamura et al. | 360/73.03 |

*Primary Examiner*—W. Chris Kim
*Assistant Examiner*—Regina Y. Neal
*Attorney, Agent, or Firm*—R. Bruce Brodie; G. Marlin Knight

[57] ABSTRACT

A method and system for resolving error or erasure in binary data streams read back using MR heads from a cyclic, multitracked recording medium. The method assesses whether an erasure or error was coincident with a thermal asperity. If the coincidence occurred, the method branches to and executes an ordered list of data recovery procedures tuned to thermal asperity. This list emphasizes early use of burst ECC correction and alteration of MR head and read channel attributes.

11 Claims, 5 Drawing Sheets

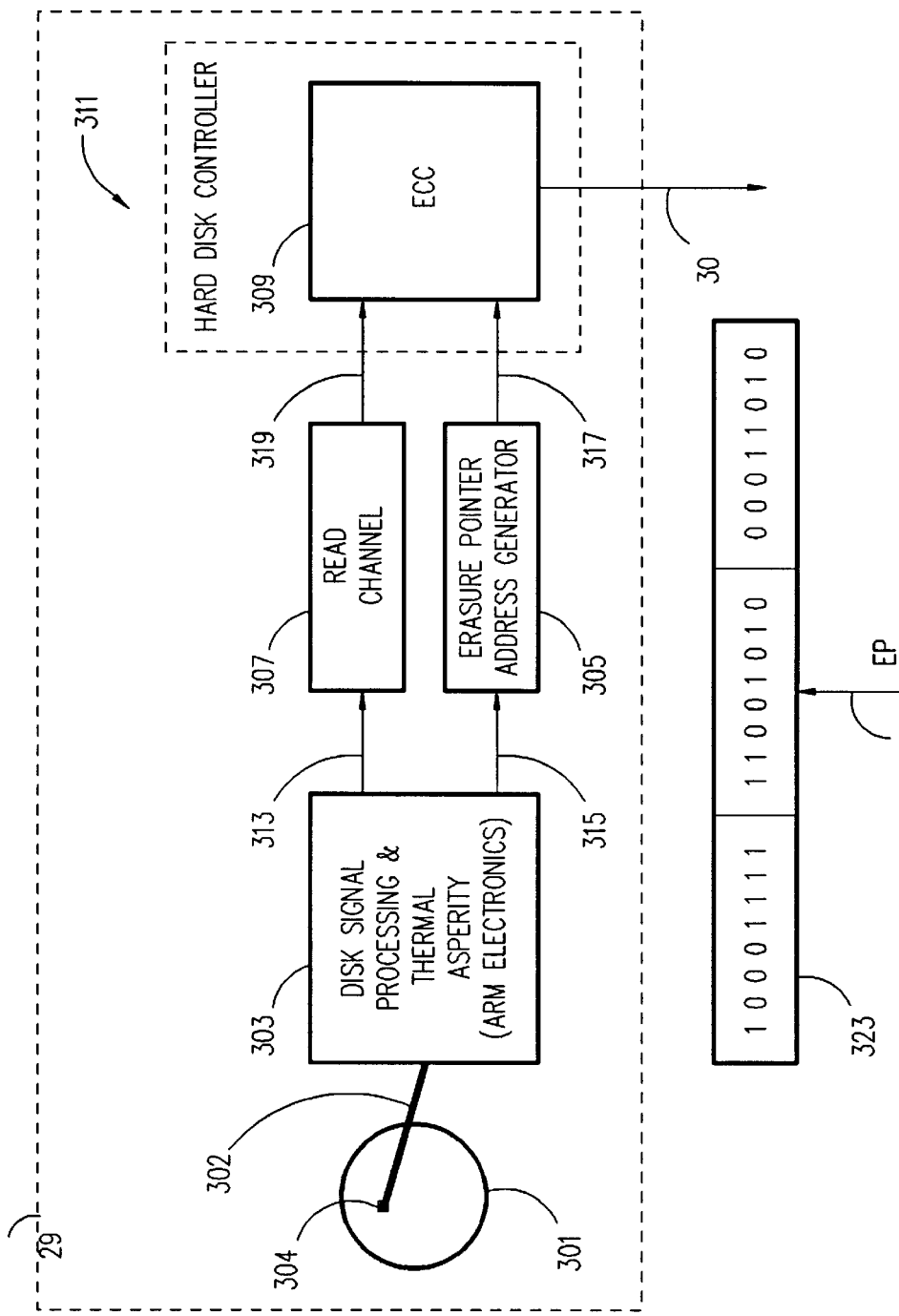

ADAPTIVE DATA RECOVERY METHOD AND MEANS TUNED TO THERMAL ASPERITIES IN A CYCLIC, MULTITRACKED MAGNETIC STORAGE SUBSYSTEM

FIELD OF THE INVENTION

The invention relates to cyclic, multitracked, magnetic storage subsystems and, more particularly, to a method and means for managing data recovery arising from different detected sources.

DESCRIPTION OF RELATED ART

It is well known that a disk drive comprises several components. These include a cyclic, sector-organized, multitracked storage medium (disk). It also includes a transducer for recording and reading binary data streams onto and from the tracks, and a mechanism for positioning the transducer over addressed tracks. It further includes devices for detecting anomalous events associated with the transducer reading of data streams from the tracks. Also, prerecorded positioning and timing information is embedded among the tracks over each disk. This is used by servo controls attached to the positioning mechanism to enable the transducer to be moved among the tracks toward or away from the rotational axis of the cyclic medium. Parenthetically, the binary data streams are expressed in codewords from a linear, cyclic, error correction code (ECC), such as a Reed-Solomon code.

Drives, Critical Dimensions, and Anomaly Detection

Each disk drive is a complex subsystem in its own right. Its life is governed by periodic and aperiodic cycles. The basic cycle is determined by the constancy of disk rotation. The number of disk rotations or fractions can measure mechanical activity thereof. Thus, accessing operations ideally should require less than several rotations on an average. Indeed, data is sometimes recorded in unusual patterns. This minimizes the likelihood that a second or third disk rotation might be required to locate an item of data. Such would occur where data is stored on a write-optimized (log-structured disk array) rather than a read-optimized (locality of referencing) basis. For an excellent discussion on the influence of access patterns and the contiguity of data stored on a disk, see Mattson et al., U.S. Pat. No. 5,551,003, "System for Managing a Log Structured Array (LSA) of DASDs by Managing Segment Space Availability and Reclaiming Regions of Segments Using Garbage Collection Procedure", issued Aug. 27, 1996.

It is common knowledge that disk track and radial recording densities (tracks per inch) have inexorably increased, flying heights of the transducer over the disk have decreased, and the strength of recorded signals has diminished. This in turn has called for increasing the number of turns on thin film inductive write head elements, elaborated the aerodynamics of transducers and arms, and spawned ultrasensitive magnetoresistive read head elements. Such crowding and tight margins increase the sources and consequences of even slight perturbations from increased intertrack magnetic coupling, more frequent track/transducer misregistrations, and greater sensitivity to thermal and mechanical shock, etc.

The increase in anomalies requires that each disk drive become heavily metered. This makes it necessary to use a number of detectors for monitoring different events at each of the critical disk activities including positioning, recording, and reading. By monitoring read back signals, it is possible to sense track/transducer misregistration or local friction heating of transducers. Other detectors cooperating with readback signal detectors can sense erasures or noise errors in binary data streams.

Program-controlled Disk Drives, Anomaly Detection and Data Recovery Procedures

Each disk drive is also a programmable computing subsystem. It includes a microprocessor and local RAM, and regulates its state and activities using its own version of a local operating system, termed a "control program". Thus, the detection of an anomalous event may be manifested as a priority interrupt to the disk drive control program. The disk drive responds to such an interrupt by invoking one or more data recovery procedures (DRPs).

The prior art is replete with descriptions of different anomalous events and responsive DRPs. For instance, the simplest DRP is that of rereading a data stream from a track in which all zero syndromes according to an ECC decoder indicate that the stream is error and erasure free. More elaborate DRPs are to be found in Cunningham et al., U.S. Pat. No. 4,516,165, "Error Recovery Procedure Using Selective Erasure", issued May 7, 1985. Cunningham disclosed that a DRP in which a disk track of interest was rendered unreadable was due to low-frequency magnetic coupling with information recorded on adjacent tracks. The track of interest could be retrieved if the adjacent tracks were first erased, the track of interest reread, and the adjacent tracks rerecorded.

The stored program control portion of a disk drive can use DRPs in several distinctive ways. A first method involves a top-to-bottom sequencing through a list of DRPs arranged in some predetermined order. This sequence would continue until an error is resolved or the subsystem declares that the error or anomaly is uncorrectable. The latter would pertain after some combination of unsuccessful DRP invocations and retries.

A second method modifies the DRP list using some degree of self-adaptation. This was disclosed also by Cunningham, U.S. Pat. No. 5,379,162, "Customized Data Recovery Procedures Selected Responsive to Readback Errors and Transducer Head and Disk Parameters", issued Jan. 3, 1995. Cunningham noted that a linear scan of a single ordered list of DRPs for a disk drive did not take into account that there could be several different and dominant error or failure mechanisms pertinent to a given disk drive type that could change over time. In Cunningham's process, the concordance between each readback error type, associated head transducer and disk parameters, and DRP was modified or tuned by way of an evaluation of a readback error history collection.

Magnetoresistive Heads and Thermal Asperities

A magnetoresistive (MR) transducer head comprises a read element and a separate write element. These are formed over each other and share common material layers. The write element is a thin film inductive head. The read element consists of an alloy film or a minute stripe, usually Ni-Fe (permalloy), that exhibits a change in resistance in the presence of a magnetic field. The read element stripe is placed next to one of the write element's magnetic pole pieces. The electrical resistance of the pernalloy changes by a few percent when it is placed in the vicinity of a magnetic field, or when it is exposed to a magnetic field having a predetermined orientation. This change in the permalloy's resistance allows the MR head to detect the magnetic flux transitions associated with the recorded bit patterns.

Thermal asperity in the context of disk storage subsystem operations connotes a localized friction heating of an MR head causing a thermal (temperature) rise and an increase in resistance, resulting at least in short duration base line offset.

The frictional heating is a consequence of collisions between an MR head and particles of disk surface matter. This results in a large DC offset disturbance in the readback signal from the disk drive. It has been observed that this distortion in the readback signal is sufficient to result in the loss of data at the location of the thermal asperity.

SUMMARY OF THE INVENTION

It is an object of this invention to devise a method and means to reduce the time necessary to resolve errors and erasures ordinarily using a linear access to an ordered list of DRPs tuned to nested possible sources of error.

It is another object of this invention to devise a method and means of data recovery that resolves error or erasure caused by thermal asperities.

These objects are believed satisfied by a method and means in which at least one anomalous event and a readback error or erasure are detected about the same time. Next, it is necessary to determine whether the detected event is a member of a set of anomalous events associated with a high error or erasure rate in the readback of recorded data streams. Lastly, a conditional branch is made to a subset of DRPs tailored to resolve that anomaly and error. Otherwise, the DRPs are executed in linear order. More particularly, where a readback error is detected in the ECC processing and a thermal asperity is also detected, then a conditional branch is taken to an ordered list tailored to resolve thermal asperity-induced errors. These include retrying the read operation. If error persists, then maximum strength ECC is invoked. The prior art, as exemplified by the Cunningham '162 patent, discloses modifications made to individual DRPs on the basis of accumulating an error history. No provision was made, as in this invention, to conditionally branch to a subset of DRPs tuned to recovery from the particular source of error. Rather, the prior art favored enhancing or tuning within each DRP as a function of error history.

BRIEF DESCRIPTION OF THE DRAWING

FIG. 2 shows a portion of the disk drive read path dedicated to signal processing and anomalous event (thermal asperity) detection.

DESCRIPTION OF THE PREFERRED EMBODIMENT

Figure 1:
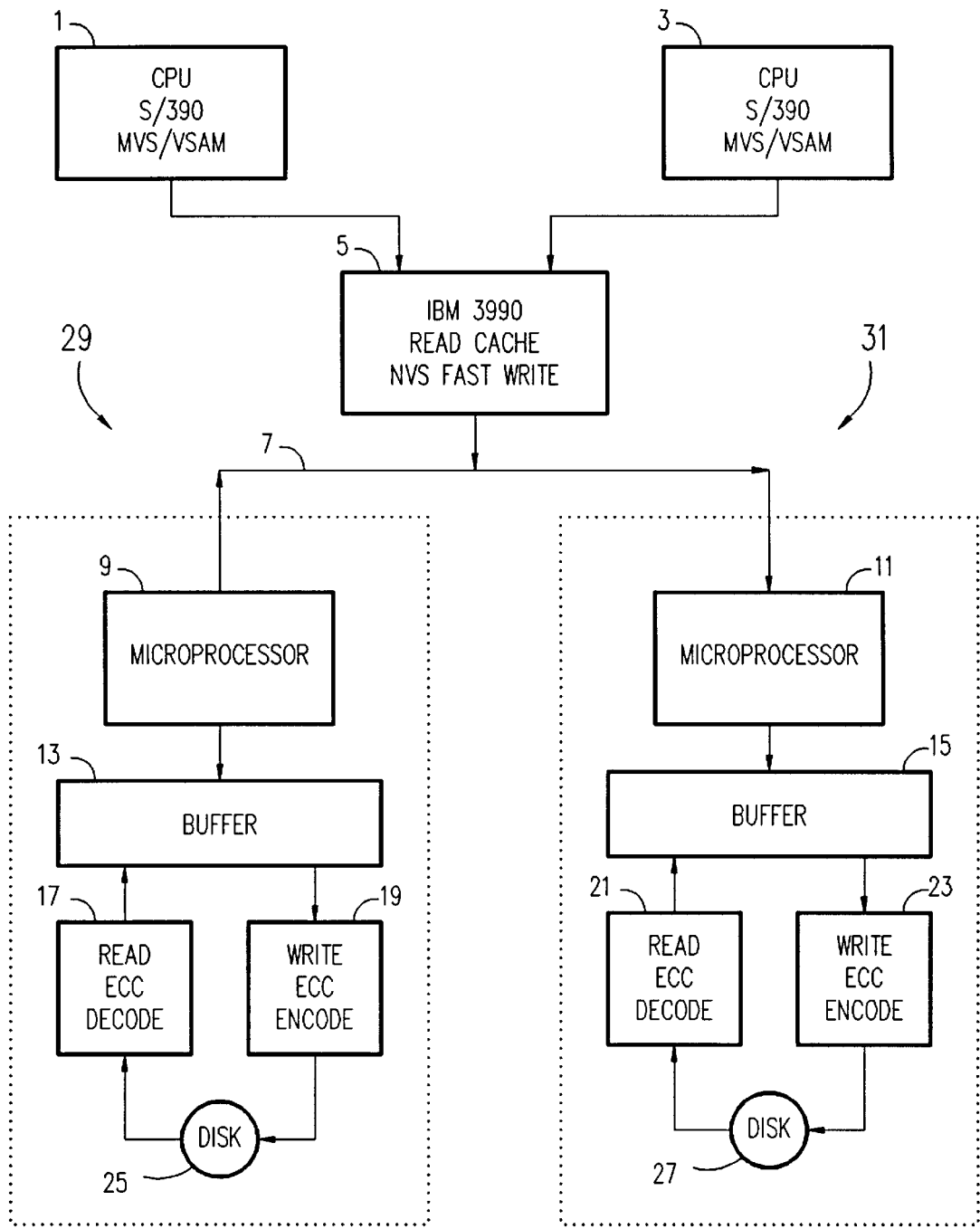
FIG. 1 depicts a system context wherein a plurality of host CPUs access disk storage through logically independent and separately optimized write and read paths.

Referring now to FIG. 1, there is depicted a system wherein a plurality of host CPUs 1 and 3 (IBM S/390s) access counterpart disk storage subsystems 29 and 31 (IBM 3390s). The access occurs through logically independent and separately optimized write and read paths, including a cache-based intermediate controller 5 (IBM 3990). Relatedly, each CPU runs under an MVS operating system and includes an access method (VSAM) that sends an encapsulated message to a 3990/3390 identifying the data object, the type of access, and its location on the subsystems 29 or 31.

The storage control unit 5 includes a large LRU-managed cache (not shown) for read referencing by the CPUs 1 and 3 and a separate nonvolatile store (not shown) for write referencing. Also, SCU 5 interprets the messages from the CPUs, including establishing an access path to tracks on disk 25 or 27 in response to a read request if data is not resident in its cache. Furthermore, SCU 5 causes data streams moved under write operations to be batched together in a separate nonvolatile store. These are later destaged to the disks. Significantly, data streams are staged or destaged to or from subsystems 29 and 31 on a disk track basis data.

When a binary data stream is written out to addressed tracks on the disk 25 over a path in the disk subsystem 29, including a microprocessor 9 and buffer 13, it is encoded in an ECC write encoder unit 19 using codewords from a linear cyclic code. One frequently used code of this type is the Reed-Solomon code. As is well appreciated in the art, the process usually consists of dividing a data stream by a coding polynomial and appending the remainder to the data as it is recorded on disk 25. The only error sensing or determination is made when a data stream is read back from a disk track 25 through ECC decoder unit 17. Upon readback, the data stream is again divided by the coding polynomial and its remainder combined under modulo addition with the recorded remainder. If the result of this modulo addition is zero, then no error has been detected. If one or more of these additions are nonzero, then further processing is necessary. The residues of this processing are termed "syndromes".

Referring now to FIG. 2, there is shown a portion of the disk drive read path dedicated to signal processing and anomalous event (thermal asperity) detection. This path includes some functional details not shown in subsystems 29 and 31 in FIG. 1. In the embodiment of FIG. 2, an arm 302 accesses the cyclic, multitracked, recording disk storage medium 301. This arm is preferably tipped with a magnetoresistive read head 304 and a thin film inductive write head (not shown). Data and events are sensed by unit 303 and passed over separate paths to a disk drive controller 311.

Figure 3A:
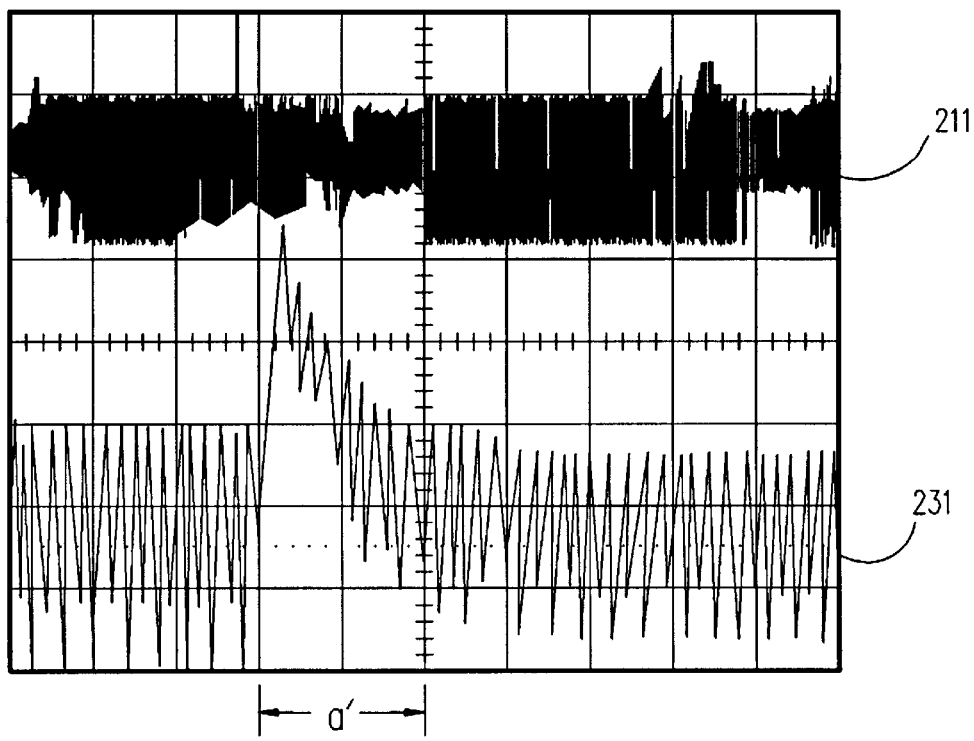
FIGS. 3A–3B set out a portion of different signal traces in the read path, including an MR head from a disk drive manifesting an error associated with thermal asperity.
Figure 3B:
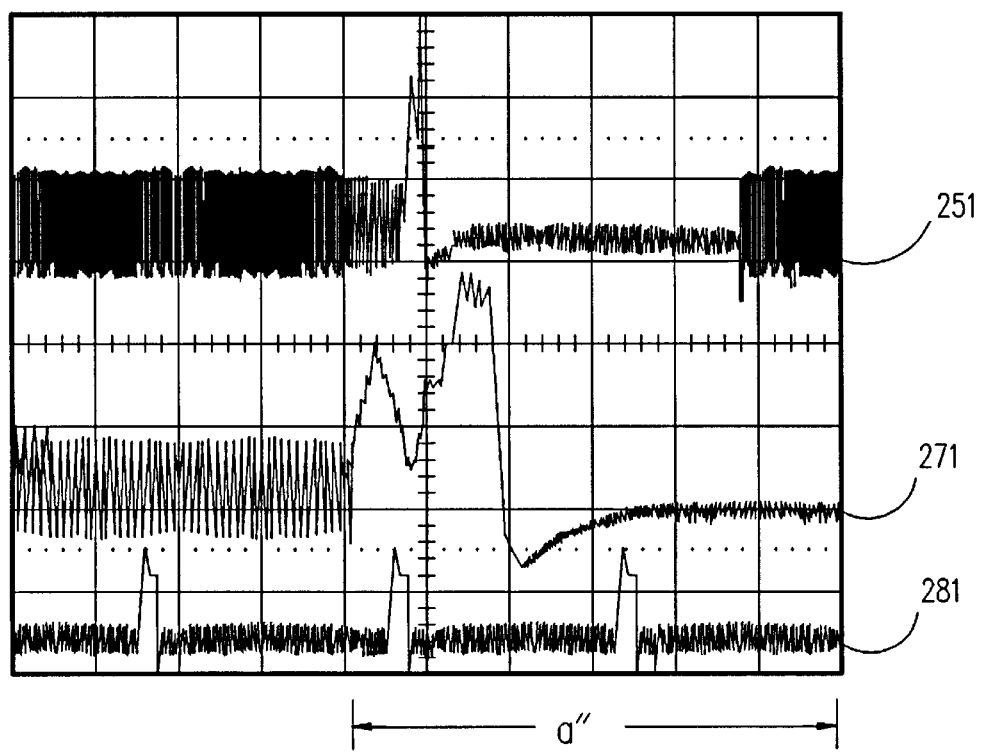

Time-varying signals as sensed from the track are shown, for instance, in FIGS. 3A and 3B. These signals must initially be resolved as to whether they express spectral patterns within or without a predetermined range. For instance, trace 211 in FIG. 3A shows an anomaly of duration a' when examined under magnification in trace 231. Similarly, trace 251 is anomalous and extends over several binary symbols as shown in its magnification trace 271 and timing trace 281 of duration a". Such a multisymbol error is termed an "erasure".

In FIG. 3B, the DC shift masks the bit changes. This DC shift masking has been associated with the occurrence of thermal asperities in magnetoresistive (MR) heads. In this situation, an asperity on disk 301 would mechanically impact MR head 304. The heat resulting from the impact would change the magnetoresistive head characteristics in the form of DC masking of any sensed flux changes. This can result in runs of erased bit values possibly exceeding the resolving power of the linear, cyclic, error correction code. Detected anomalous events, such as track/head misalignrents, read/write head state changes, thermal asperities, etc. are reported to an address generator 305. The report is made separately over path 315. This occurs while detected binary bits are extracted by circuits in signal processing unit 303 and passed to the controller 311 over read channel 307.

Referring now to the bottom of FIG. 2, generator 305 provides an address or pointer 321 associated with the location 323 of the event on the disk to the controller over path 317. Such anomalous events are statistically associated with erasures. Consequently, their pointers are used to modify the values involved in locating the roots of the modified error locator polynomialσ'(z) when it is subjected to an extended Berlekamp-Massey process.

Figure 4:
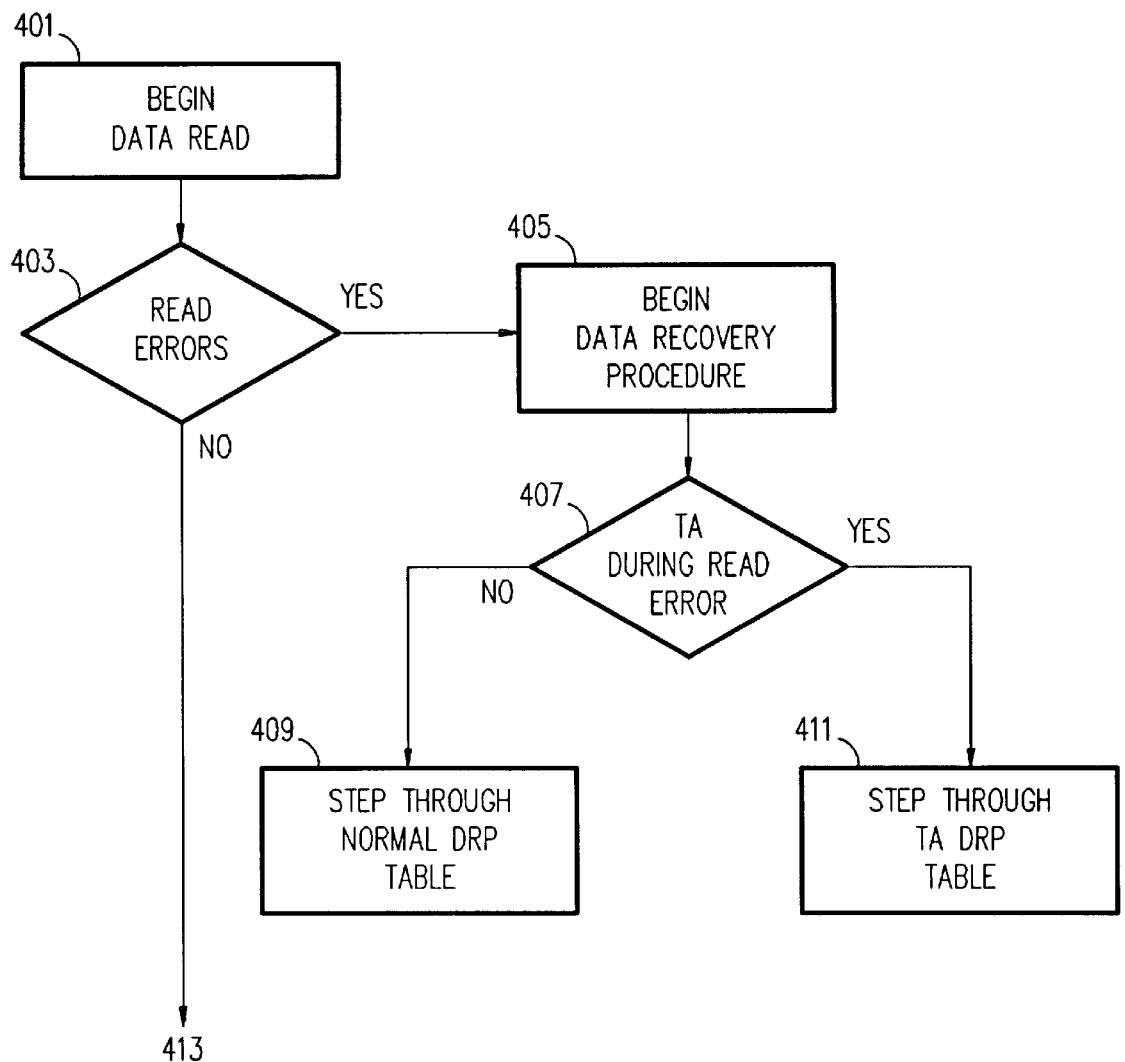
FIGS. 4 and 5 respectively illustrate simple flow of control structures for shortening the time for resolving errors coincident with detected events.
Figure 5:
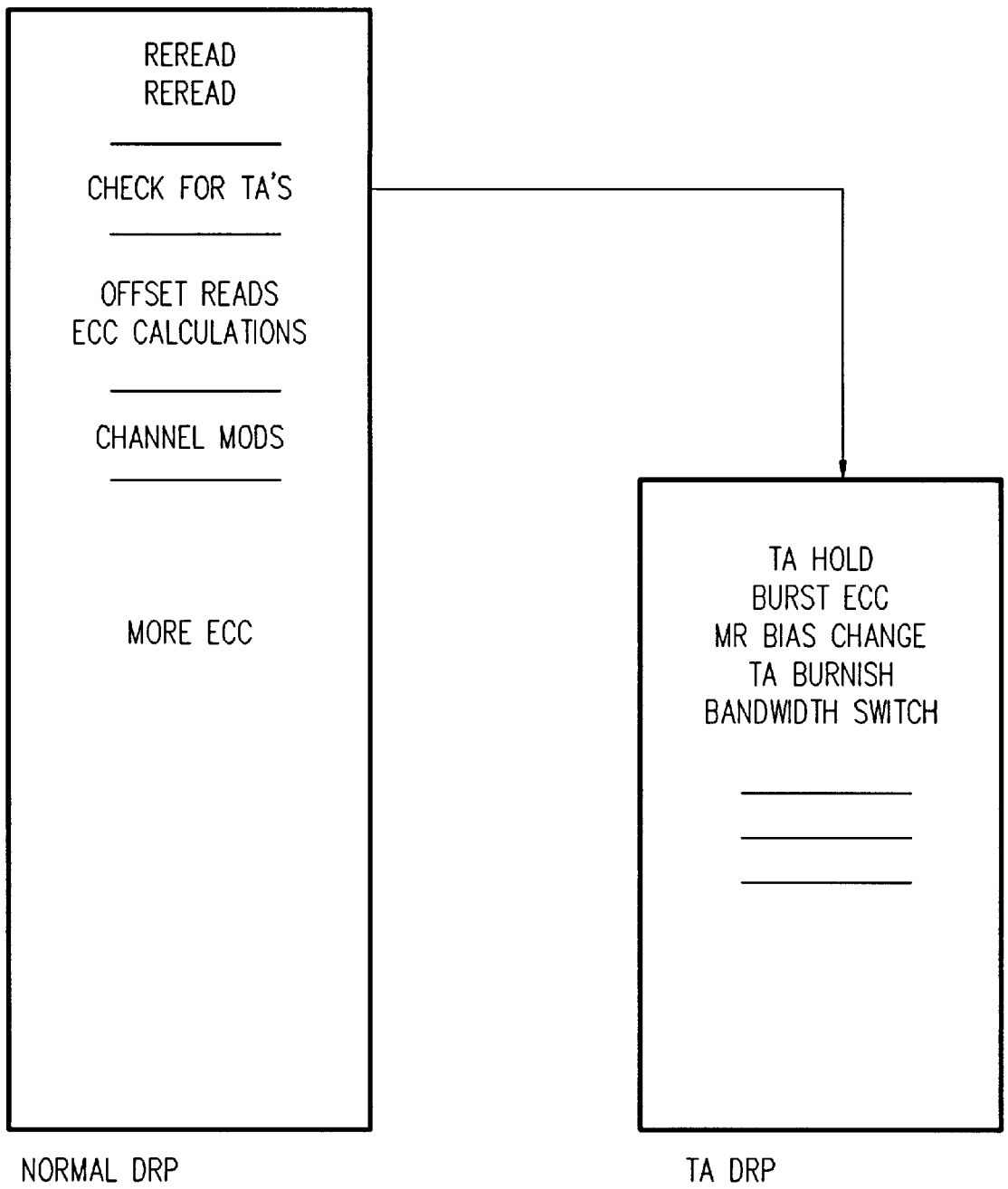

Referring now to FIGS. 4 and 5, there are respectively illustrated simple flow-of-control structures for shortening the time for resolving errors coincident with detected events. As previously mentioned, data stream error and erasure due to thermal asperities has an increasingly higher likelihood of occurrence in the dense recording environments requiring MR read heads. The key to resolution upon detection is to branch to a linear list or table focused on resolving the detected anomaly. If errors are present, then nonzero syndromes are computed and an interrupt is set, forcing a branch via step 403 to the DRP initialization in step 405. Otherwise, errors are not sensed and the subsystem continues processing of accessing read or write commands.

Thermal asperities are often manifest as erasures such that the generation of an erasure pointer EP sets another interrupt. This forces a branch to a table 411 focused on resolving an error cause by thermal asperities via step 407. Otherwise, the storage subsystem steps through the normal DRP sequences in step 409.

Referring to FIG. 5, there is depicted a linear list of recovery actions for a recovery absent a concurrent event detection and the list of recovery actions when a conditional branch is made, as in steps 407 and 411. Two items are paramount. First, checking for the occurrence of thermal asperities (TAs) occurs higher (earlier) in the list for the normal DRP. Secondly, burst ECC is invoked early in the list recovery actions. Other recovery actions for the TA DRP are also listed, including changing the MR bias, a TA burnish, and a bandwidth switch.

The nature, quality, and the order of the TA recovery actions significantly affect the speed and accuracy of the recovery. For this reason, the actions will be discussed in the order in which they are recited in FIG. 5, namely, TA hold, burst ECC, MR bias change, TA burnish, and bandwidth switch.

TA hold is a procedure used to recover from thermal asperities. The asperities cause the MR head to distort the waveforms read back from the disk track. This results in a loss of amplitude and timing corrections and loss of read channel synchronization with the readback signal. In this regard, the TA hold procedure uses the corrections from a point just prior to the asperity-caused changes and lasts through the disturbance period. Relatedly, the TA hold procedure can be either invoked when a TA is sensed, or it can be set to start in front of a known place on the track associated with the asperity.

Burst ECC is an error correction procedure in Reed-Solomon linear cyclic code recovery in which erasure values in a data stream read back from a disk track can be calculated using erasure pointers (EPs), syndromes, and an error location polynomial. EPs identify the disk location of a detected thermal asperity. Since erasures are frequently associated with thermal asperities, the burst ECC code using EPs reduces the time and the number of redundancy bytes needed for a given maximum number of consecutive bytes in error (burst error length).

MR read element bias current change is a recovery procedure wherein reduction of the bias current minimizes any deep saturation amplitude swings resulting from the thermal asperity. Consequently, rather than mask both amplitude and duration of a data stream, only the bit values are lost. However, such values are burst ECC code correctable.

TA burnish is a mechanical operation by which a head is repeatedly positioned in either a hover or a back and forth motion over a detected asperity location to wear it down.

A bandwidth switch is a recovery procedure in which the magnitude of the alternating current coupling poles in the read channel is changed for electronically reducing the size of many thermal asperities.

While the invention has been described with respect to an illustrative embodiment thereof, it will be understood that various changes may be made in the method and means herein described without departing from the scope and teaching of the invention. Accordingly, the described embodiment is to be considered merely exemplary and the invention is not to be limited except as specified in the attached claims.

What is claimed is:

1. In a system having at least one cyclic, multitracked storage medium, means including a transducer for recording and reading binary data streams onto and from ones of said tracks, said data streams comprising codewords in an error correction code (ECC), means for detecting anomalous events associated with the transducer reading of said track-recorded data streams, and means responsive to detected events for executing an ordered list of data recovery protocols (DRPs) to resolve any consequential errors, a method for adaptively managing recovery from said detected events, comprising the steps of:

(a) concurrently detecting at least one anomalous event and an error or erasure in the read back of a track-recorded data stream;

(b) responsive to said concurrent detection, ascertaining whether the detected event is a member of a set of events associated with a high error or erasure rate in the read back of recorded data streams; and (c) if the event is a member of the set of high error or erasure rate events, executing an ordered sublist of predetermined ones of the list of DRPs for resolving the detected error or erasure, otherwise executing the DRPs of the list in linear order whereby the average time of said system in executing lists of DRPs is reduced.

2. The method according to claim 1, wherein:

the set of events associated with a high error or erasure rate in the read back of recorded data streams includes localized friction heating of transducers (thermal asperities or TAs) and track and transducer misregistrations as the detected anomalous events;

the transducer comprises a thin film inductive write head and a biased magnetoresistive (MR) read head;

the means for reading binary data streams includes a channel of predetermined bandwidth and equalization characteristics; and the step of executing an ordered sublist of predetermined ones of the list of DRPs includes selecting at least one DRP from an ordered list of DRPs consisting of a TA hold, a burst ECC correction, a change in MR bias, a TA burnish, a bandwidth change, and change in equalization characteristics.

3. The method according to claim 2, wherein:

the ECC is of the Reed-Solomon linear, cyclic, error correction code type; and the step of executing an ordered sublist of predetermined ones of the list of DRPs includes correcting any erasures in the data stream coincident with the detection of at least one TA using only syndromes, erasure pointers, and error location polynomials of an Reed-Solomon decoder without calculation of any intermediate error or erasure value polynomial.

4. In a storage subsystem having at least one cyclic, multitracked storage medium, means including a transducer for recording and reading binary data strings onto and from ones of said tracks, said data strings comprising codewords in an error correction code (ECC), means for detecting anomalous events associated with the transducer reading of said track-recorded data streams, and means responsive to detected events for executing an ordered list of data recovery protocols (DRPs) for resolving consequential errors, a method for adaptively managing recovery, comprising the steps of:

(a) concurrently detecting an error or erasure and at least one thermal asperity (TA) as the anomalous event in reading track-recorded data streams; and (b) responsive to the concurrent detection, executing an ordered sublist of predetermined ones of the list of DRPs for resolving the error or erasure, otherwise executing the DRPs of the list in linear order whereby the average time of said subsystem in executing lists of DRPs is reduced.

5. The method according to claim 4, wherein said sublist and sublist execution order include a thermal asperity (TA) hold, burst ECC correction, minimizing read head saturation, thermal asperity burnish, and bandwidth switching.

6. The method according to 4, wherein step (a) further includes the step of forming a pointer (EP) to the location of a detected TA on the disk, further wherein step (b) includes burst Reed-Solomon type ECC correction as a DRP on the ordered sublist, and in the event the burst ECC is invoked as a DRP, said step (b) further includes the step of correcting an error or erasure by determining the error or erasure value utilizing only the EP, the syndromes, and an error locator polynomial.

7. An apparatus for adaptively managing recovery of recorded binary data streams affected by error or erasure, comprising:

at least one cyclic, multitracked storage medium;

means including a transducer for recording and reading binary data streams onto and from ones of said tracks, said data streams comprising codewords in an error correction code (ECC);

means for concurrently detecting at least one anomalous event and an error or erasure in the read back of a track-recorded data stream;

means responsive to said concurrent detection for ascertaining whether the detected event is a member of a set of events associated with a high error or erasure rate in the read back of recorded data streams; and means responsive to any ascertainment that the event is a member of the set of high error or erasure rate events for executing an ordered sublist of predetermined ones of an ordered list of data recovery procedures (DRPs) for resolving the detected error or erasure, otherwise executing the DRPs of the list in linear order whereby the average time of said apparatus in executing lists of DRPs is reduced.

8. The apparatus according to claim 7, wherein the set of events associated with a high error or erasure rate in the read back of recorded data streams includes localized friction heating of transducers (thermal asperities or TAs) and track and transducer misregistrations as the detected anomalous events, and further wherein the means for concurrently detecting error or erasure and at least one anomalous event includes ascertaining any readback signal deviance attributable to TAs.

9. The apparatus according to claim 7, wherein the transducer comprises a thin film inductive write head and a biased magnetoresistive (MR) read head.

10. The apparatus according to claim 7, wherein the means for reading binary data streams includes a channel of predetermined bandwidth and equalization characteristics.

11. The apparatus according to claim 7, wherein the transducer means includes a biasable magnetoresistive (MR) read head, wherein the means for executing an ordered sublist of predetermined ones of the list of DRPs includes means for selecting at least one DRP attributable to the detection of a thermal asperity (TA) from an ordered sublist of DRPs consisting of a TA hold, a burst ECC correction, a change in MR bias, a TA burnish, and a bandwidth change.

* * * * *